US009275559B2

(12) United States Patent
Luther et al.

(10) Patent No.: US 9,275,559 B2
(45) Date of Patent: Mar. 1, 2016

(54) IDENTIFICATION MEDIUM CONFIGURED FOR DISPLAYING VISIBLE AND EXCITABLE INDICIA

(75) Inventors: David P. Luther, Duncanville, TX (US); Winthrop D. Childers, San Diego, CA (US)

(73) Assignee: Precision Dynamics Corporation, Valencia, CA (US)

( * ) Notice: Subject to any disclaimer, the term of this patent is extended or adjusted under 35 U.S.C. 154(b) by 1063 days.

(21) Appl. No.: 12/546,489

(22) Filed: Aug. 24, 2009

(65) Prior Publication Data

US 2011/0045256 A1 Feb. 24, 2011

(51) Int. Cl.

*C09D 11/00* (2014.01)
*C09K 11/06* (2006.01)
*G03H 1/00* (2006.01)
*B42D 15/00* (2006.01)
*D21H 21/46* (2006.01)
*G03G 7/00* (2006.01)
*G09F 3/00* (2006.01)

(52) U.S. Cl.

CPC *G09F 3/00* (2013.01); *G09F 3/005* (2013.01); *Y10T 428/24835* (2015.01)

(58) Field of Classification Search

CPC .... G09F 3/00; G09F 3/005; Y10T 428/24835
USPC ............. 428/195.1, 199; 283/109, 91, 72, 94; 106/31.15; 252/301; 359/2
See application file for complete search history.

(56) References Cited

U.S. PATENT DOCUMENTS

| | | | | |
|---|---|---|---|---|
| 5,516,590 | A * | 5/1996 | Olmstead et al. | 428/32.84 |
| 5,605,738 | A * | 2/1997 | McGinness et al. | 428/195.1 |
| 7,163,728 | B2 * | 1/2007 | Finger | 428/40.1 |
| 7,184,569 | B2 | 2/2007 | Lawandy et al. | |
| 7,762,468 | B2 * | 7/2010 | Jones et al. | 235/491 |
| 7,927,688 | B2 * | 4/2011 | Abrams et al. | 428/195.1 |
| 2003/0035131 | A1 * | 2/2003 | Dukler et al. | 358/1.14 |
| 2005/0087605 | A1 * | 4/2005 | Auslander et al. | 235/491 |
| 2005/0178841 | A1 | 8/2005 | Jones, II et al. | |
| 2005/0184872 | A1 | 8/2005 | Clare et al. | |
| 2007/0119951 | A1 | 5/2007 | Auslander et al. | |
| 2007/0170241 | A1 | 7/2007 | Grant et al. | |

(Continued)

FOREIGN PATENT DOCUMENTS

| | | |
|---|---|---|
| JP | 2000284694 | 10/2000 |
| JP | 2008024749 | 2/2008 |

OTHER PUBLICATIONS

Ralph Dillon, Edward Arling and Lucas Lindsey; Bar Code Supplement—Raising the Bar: The Future of Bar Codes; Medical Device Link website; 2001; Pharmaceutical & Medical Packaging News.

*Primary Examiner* — Mark Ruthkosky
*Assistant Examiner* — Laura C Powers
(74) *Attorney, Agent, or Firm* — Kelly & Kelley, LLP

(57) ABSTRACT

An identification medium is optimized for displaying visible and excitable indicia. The medium includes a substrate having a color change layer, such as a direct thermal layer, and a patterned excitable layer placed over the color change layer. The color change layer produces the visible indicia. The excitable layer produces the excitable indicia. The excitable indicia is not easily readable under ambient light but becomes more easily readable under directed radiation, i.e., UV or IR light.

23 Claims, 2 Drawing Sheets

(56) References Cited

U.S. PATENT DOCUMENTS

| | | | | |
|---|---|---|---|---|
| 2007/0210164 | A1* | 9/2007 | Conlon et al. | 235/462.01 |
| 2007/0257118 | A1* | 11/2007 | Riley et al. | 235/494 |

* cited by examiner

IDENTIFICATION MEDIUM CONFIGURED FOR DISPLAYING VISIBLE AND EXCITABLE INDICIA

BACKGROUND OF THE INVENTION

The present invention generally relates to identification media and manners of displaying information thereupon. More particularly, the present invention relates to identification media, such as wristbands, labels and tags, which are optimized for simultaneously displaying visible and excitable indicia in manner where both types of indicia are readable.

Such identification medium allows for the encoding or encryption of information displayed on the medium. The excitable indicia may comprise printed letters or numbers for communicating certain identification information only when exposed to directed radiation, i.e., ultraviolet or infrared radiation. The excitable indicia may also comprise a barcode or similar device capable of communicating a large amount of information through reference to an information system.

An identification medium according to the present invention that is optimized for displaying visible and excitable indicia can find utility in a number of fields. For example, such identification media can find utility in identifying and tracking individual product-items or packages travelling through a production, manufacturing, packaging, and shipment fulfillment or distribution assembly line. Such utility is described in U.S. patent application Ser. No. 11/714,491 filed by Conlon et. al. The Conlon application describes labeling consisting of the combination of an invisible marking overlapping a visible marking. The invisible marking fluoresces under directed radiation. However, Conlon does not address the issue of radiation interference between the invisible marking and light emitted by the media material. Conlon also does not contemplate that the visible marking be made by a direct thermal layer or address the issue of such direct thermal layer typically being soluble in excitable inks.

Another application can be found in an e-pharmacy setting wherein a tote or shipping container is used for delivering prescriptions to patients or families. This is similar to the shipment fulfillment or distribution function described in the Conlon application. An identification label made according to the present invention may be applied to the tote. The identification label initially includes a UV barcode that uniquely identifies the label and the tote to which it is applied. The UV barcode is scanned by a reader and then the label is printed upon with information concerning the prescriptions that are to be placed in the tote. An information system then correlates the UV barcode with the prescription information. After the prescriptions are placed in the tote, the prescription information can be quickly checked against the contents.

Accordingly, there is a need for an identification medium that is capable of displaying both visible and excitable indicia wherein emission by the medium itself does not interfere with information emitted by the excitable indicia during a scanning operation. In addition, there is a need for such an identification medium wherein the ink that forms the excitable indicia does not dissolve or otherwise damage the layer that displays the visible indicia. The present invention satisfies these needs and provides other related advantages.

SUMMARY OF THE INVENTION

The present invention is directed to an identification medium, such as a label, a wristband or a tag, configured for displaying visible and excitable indicia. The identification medium comprises a substrate having a printable layer for displaying the visible indicia. An excitable ink comprising the excitable indicia is disposed overlying the printable layer. The excitable ink exhibits luminescence when it is exposed to directed radiation. In addition, the excitable ink is configured to generate a higher emitted intensity of a readable spectrum of light as compared to the printable layer and/or the substrate when both are exposed to the directed radiation. The directed radiation preferably comprises ultraviolet light.

In a first embodiment the substrate and/or printable layer preferably has a density of optical brighteners below a predetermined threshold to reduce an intensity of background radiation emitted by the substrate and/or printable layer. This reduced background radiation results in a sufficiently high signal-to-noise ratio of the light emitted by the excitable layer relative to the background radiation to allow a scanner system to read the excitable indicia without error.

The printable layer comprises a direct thermal layer and is configured to display the visible indicia when activated by a thermal print head. Preferably, the direct thermal layer is insoluble in the excitable ink. In addition, the identification medium may comprise a clear cover layer disposed between the printable layer and the excitable ink. Where the clear cover layer is included, it is not necessary that the direct thermal layer be insoluble in the excitable ink.

A second embodiment of the invention optimizes the spectral distribution of the excitable layer relative to the substrate and/or printable layer. When the identification medium is exposed to the directed radiation, the substrate emits light having a first spectral distribution and the excitable ink emits light having a second spectral distribution. The second spectral distribution enables a scanner system to read the excitable indicia. In addition, the first spectral distribution is sufficiently different from the second spectral distribution so as to maintain a high enough signal-to-noise ratio to allow the scanner system to read the excitable indicia under the directed radiation without unacceptable interference from light emitted by the substrate and/or the printable layer. The excitable ink includes fluorescent components configured to emit light having the second spectral distribution when exposed to the directed radiation. The fluorescent components include one or more of a fluorescent pigment and a fluorescent dye.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
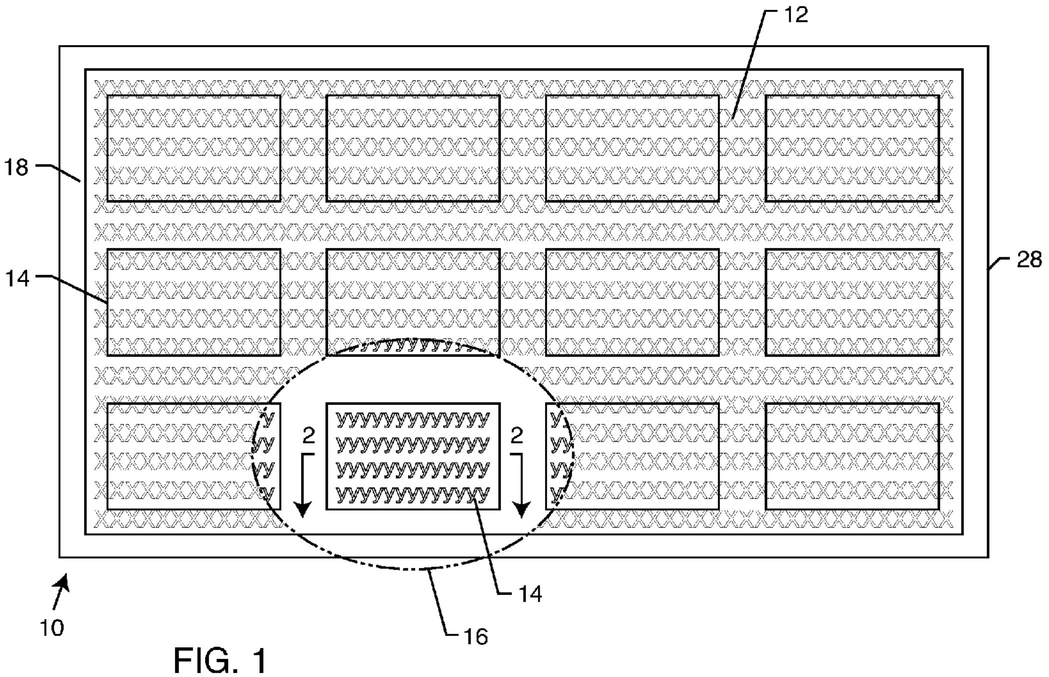
FIG. 1 is a plan view of a label embodying the present invention.
Figure 2:
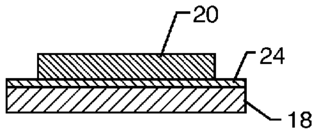
FIG. 2 is a cross-section view taken along line 2-2 of FIG. 1 illustrating only the substrate and excitable ink layers.
Figure 3:
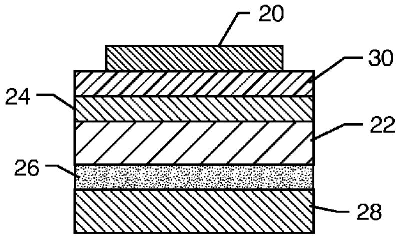
FIG. 3 is a cross-section view taken along line 2-2 of FIG. 1 illustrating all layers.

With reference now to FIGS. 1-3, a label 10 according to the present invention is illustrated. While the following detailed description will discuss the present invention in terms of labels, the present invention is equally applicable in wristbands, tags, and other forms of identification media.

FIG. 1 illustrates the label 10 displaying visible indicia 12 and a repeating pattern of rectangles representing excitable indicia 14. The visible indicia 12—illustrated by the letter "x"—may be printing using ink jet printing, thermal printing or any other available means of printing visible indicia 12. The excitable indicia 14—illustrated by the letter "y"—may be printed using excitable ink that fluoresces or otherwise becomes more readable when exposed to directed radiation 16, such as UV or IR light. The excitable ink may be readable with some difficulty under ambient light. Exposure to directed radiation 16 is intended to make the excitable indicia 14 more readable than when exposed to just ambient light.

The excitable indicia 14 may be presented on the label 10 in any pattern that satisfies the needs of the use for which the label 10 is intended. The excitable indicia 14 preferably comprise barcodes, but may also include serial numbers, or any other information that is to be encoded, encrypted or otherwise conveyed using excitable ink. Such excitable indicia 14 may be formed using an inkjet printer using UV ink or similar ink that is excitable by directed radiation 16.

The visible indicia 12 is readable by a human or machine in ambient light, such as sunlight, incandescent, fluorescent or other forms of light that illuminate an environment. Such visible indicia 12 can be read through the excitable indicia 14 which appears mostly clear or translucent in ambient light. The excitable indicia 14 becomes readable by machine or human in the presence of directed radiation 16. Preferably, the excitable indicia 14 is readable by a UV or IR scanner which generates its own source of directed radiation 16.

The label 10 primarily comprises a substrate layer 18 and an excitable layer 20 that includes the excitable indicia 14. The excitable layer 20 is not necessarily a separate layer inasmuch as it is excitable ink patterned onto the substrate layer 18 or printable layer 24 to form the excitable indicia 14. The substrate layer 18 may include a base layer 22 with a printable layer 24 on top, which bears or yields the visible indicia. The base layer 22 also has a pressure sensitive adhesive layer 26 and release layer 28 on bottom. The base layer 22, adhesive layer 26 and release layer 28 are all well known elements in the field of identification media. An overcoat or clear cover layer 30 may also be included between the substrate layer 18 and the excitable layer 20.

FIGS. 2-3 illustrate the substrate layer 18, the excitable ink layer 20 and other layers with exaggerated thicknesses. The exaggerated thicknesses are merely illustrated for clarity. Those skilled in the art will realize that the actual thicknesses of the various layers are much smaller than depicted and not depicted relative to thicknesses of other layers.

The printable layer 24 may comprise a direct thermal layer, color change layer or other similar layer that can accept and display visible indicia 12 from a thermal printer. Such a direct thermal layer functions by changing on a pixel-by-pixel basis from white to black or clear to black in response to thermal energy pulses received from a thermal print head. The direct thermal layer may also change colors depending upon its composition and the energy from the thermal print head. Preferably, the printable layer 24 includes protection against solvents used when the excitable layer 20 is formed. Such solvents typically dissolve color change layers or similarly constructed layers. Accordingly, the printable layer 24 should be solvent insensitive or insoluble in the solvents used with the excitable layer 20.

Alternatively, the label 10 may include the clear cover layer 30 between the printable layer 24 and the excitable layer 20. This clear cover layer 30 presents a transparent barrier between the printable layer 24 and solvents used on the excitable layer 20. In this construction the printable layer 24 may still be printed upon because the energy from a thermal print head will pass through the clear cover layer 30 and activate the direct thermal layer or color change layer. The clear cover layer 30 should be of sufficient thickness so as not to interfere with printing when the printable layer 24 is a direct thermal layer as described below. Co-pending application Ser. No. 12/029,060 discusses concerns regarding the relationship between such a cover layer and a direct thermal layer.

Preferably, the printable layer 24 and the excitable layer 20 are configured to enable a scanner system (not shown) with a directed radiation 16 source to read the excitable indicia 14 on the excitable layer 20 without interference from the underlying media that includes printable layer 24, substrate layer 18, and perhaps other layers. Ordinarily, most direct thermal layer materials include brighteners that tend to fluoresce or emit visible light when exposed to UV light. These brighteners provide a white appearance for label 10 and improve contrast between the visible indicia 12 and the background of label 10 in ambient light. However, these brighteners may fluoresce under the directed light thereby emitting background light or radiation that interferes with the light emitted by the excitable ink. This background radiation may be sufficient to "drown out" the intended signal to be received from the excitable layer.

This problem is solved by the substrate 18 and/or printable layer 24 preferably including a density of brighteners below a predetermined threshold so as to create a sufficiently low intensity of emitted visible radiation when exposed to the directed radiation 16 such as UV light. Stated another way, the density of brighteners should be optimized so as to create a high signal-to-noise ratio of the radiation emitted by the excitable indicia 14 relative to background radiation that is emitted by the printable layer 24 and/or substrate 18. A sufficiently high signal-to-noise ratio allows a scanner system to reliably read the excitable indicia 14 without too much interference from the background radiation of the printable layer 24 and/or substrate 18. Ideally, the predetermined threshold for density of brighteners provides a reflectance of approximately 84 percent.

Alternatively, the interference between the excitable indicia 14 and background radiation emitted by layer 24 and/or substrate 18 can be remedied by using an excitable ink whose emitted wavelength has a different spectral characteristic or emission wavelength distribution from that of the background radiation emitted by layer 24 and/or substrate 18. One could then use a scanner system that is sensitive only to the spectral characteristic or emission wavelength distribution of the excitable indicia 14. In an exemplary embodiment, the spectral characteristic of light emitted by the excitable indicia 14 would have a spectral peak at a longer wavelength than the spectral characteristic of light emitted by printable layer 24 and/or substrate 18. This difference in the spectral characteristics results in a high signal-to-noise ratio for the scanner when the label 10 is exposed to directed radiation 16. This high signal-to-noise ratio allows a scanner system sensitive to the spectral characteristic of the excitable indicia 14 to read the excitable indicia 14 without errors caused by excited emissions from layer 24 and/or substrate 18.

The excitable layer 20 comprises indicia that are excitable by UV or IR light that overlay the printable layer 24 and/or substrate 18 (with perhaps another layer such as transparent layer 30 therebetween). In an exemplary embodiment excitable layer 20 is formed by printing indicia over layer 24 using a piezoelectric inkjet printer that ejects excitable ink. In this exemplary embodiment the excitable ink is then cured using UV light after being printed. In one particular embodiment the excitable ink is a fluorescent UV curable ink that fluoresces under UV light. Such a fluorescent ink preferably includes one or more fluorescent components such as a fluorescent pigment, a fluorescent dye, or a combination of a fluorescent dye and pigment. Typical fluorescent pigments and dyes are made by various companies such as E. I. du Pont de Nemours and Company, Cabot Corporation, Sun Chemical Corporation, Clariant International Ltd, BASF, and others.

Figure 4:
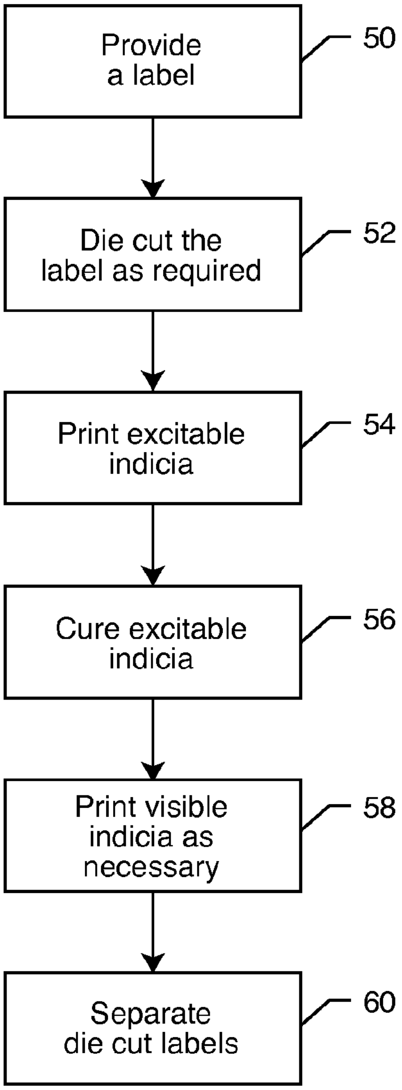
FIG. 4 is a flow-chart illustrating a method for preparing a label according to the present invention.

FIG. 4 illustrates a flow chart for the preparation of labels 10 according to the present invention. The preparation process begins with providing (50) the label 10 having at least layers 18 and 24 as discussed with respect to FIGS. 2 and 3. The label 10 may then be die cut (52) to meet the size requirements for the intended use of the labels 10. Die cutting the label may alternatively be performed later in the process as will be noted. The excitable indicia 14 are printed (54) over printable layer 24. In one embodiment the excitable indicia 14 are printed directly onto layer 24. In a second embodiment the excitable indicia 14 are printed onto transparent layer 30 that protects printable layer 24. The excitable layer 20 is then cured (56) so as to fix the excitable indicia 14 onto the label 10. Visible indicia 12 may then be formed (58) in the printable layer 24 on the label 10 as necessary and the die cut labels 10 can be separated (60) as desired. As noted above, step (52) of die cutting the label may alternatively be performed after the forming step (58) but before the separating step (60). In yet another embodiment, the separating step (60) is not yet performed so that the labels may remain in a reel before they are used.

Figure 5:
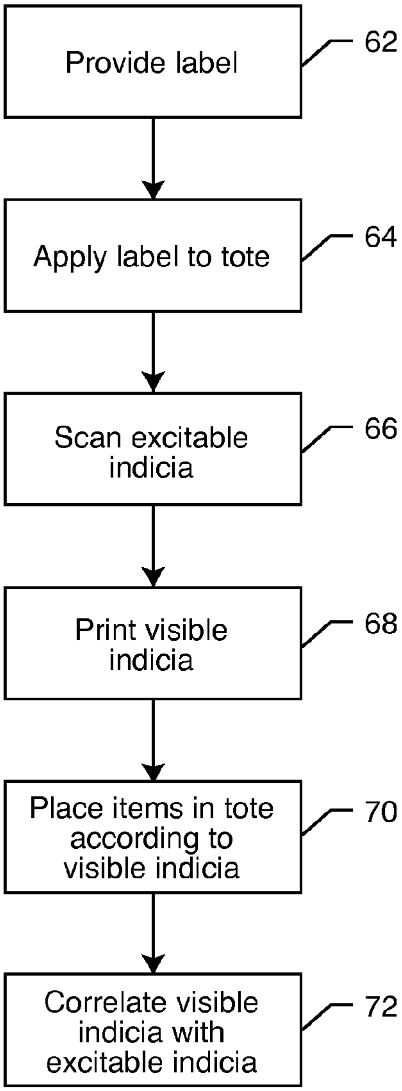
FIG. 5 is a flow-chart illustrating a method for using a label according to the present invention.

FIG. 5 illustrates a flowchart for the use of labels 10 according to the present invention. The use process begins with providing (62) labels 10 following the structure and process described above with respect to FIG. 4. Then the label 10 is applied (64) to a tote or container to be identified. The excitable indicia 14 is then scanned (66) and visible indicia 12 are printed (68) on the label 10 using a thermal printer or other appropriate printing method. Items may then be placed (70) in the tote according to the visible indicia 12. An information system correlates (72) the items described by the visible indicia 12 and placed in the tote with the barcode or other symbol displayed by the excitable indicia 14. In an alternative embodiment, the printing step (68) is performed prior to the applying step (64) while the labels are in a reel to reel form.

Although several embodiments of the present invention have been described in detail for purposes of illustration, various modifications may be made without departing from the spirit and scope of the invention. Accordingly, the invention is not to be limited, except as by the appended claims.

What is claimed is:

1. An identification medium configured for displaying visible and excitable indicia, comprising:

a substrate having a print displaying layer wherein the print displaying layer comprises a direct thermal or color change layer configured to accept and display the visible indicia in response to thermal energy pulses from a thermal printer, wherein the direct thermal or color change layer is itself insensitive to or insoluble in solvents used with excitable inks;

an excitable layer comprising excitable ink forming the excitable indicia, said excitable layer overlying the print displaying layer, wherein the excitable indicia is printed separately from the visible indicia; and wherein the excitable ink exhibits luminescence when exposed to directed radiation, and the excitable ink is configured to generate a higher emitted intensity of a readable spectrum of light as compared to the print displaying layer when both are exposed to the directed radiation.

2. The identification medium of claim 1, wherein the substrate and the print displaying layer having a density of brighteners below a pre-determined threshold, the pre-determined threshold for density of brighteners providing a reflectance of 84%, and the density of brighteners in the substrate and print displaying layer generate a lower emitted intensity of visible light when exposed to directed radiation than when exposed to ambient light, such that a signal-to-noise ratio of the excitable indicia under the directed radiation is configured so as to be readable by a scanner system without interference from the visible indicia.

3. The identification medium of claim 1, further comprising a clear cover layer disposed between the print displaying layer and the excitable ink.

4. The identification medium of claim 1, wherein the substrate emits light having a first spectral distribution and the excitable ink emits light having a second spectral distribution when the identification medium is exposed to the directed radiation.

5. The identification medium of claim 4, wherein the second spectral distribution of the excitable ink is configured so as to be readable by a scanner system and wherein the first spectral distribution of the substrate has an intensity lower than that of the second spectral distribution such that a signal-to-noise ratio of the excitable ink under the directed radiation is configured so as to be detectable by the scanner system.

6. The identification medium of claim 4, wherein the excitable ink includes a fluorescent component configured to emit light having the second spectral distribution when exposed to the directed radiation, the fluorescent component including one or more of a fluorescent pigment and a fluorescent dye.

7. The identification medium of claim 1, wherein the directed radiation comprises ultraviolet or infrared light.

8. The identification medium of claim 1, wherein the identification medium comprises a label, a wristband or a tag.

9. An identification medium configured for displaying visible and excitable indicia, comprising:

a substrate having a print displaying layer wherein the print displaying layer comprises a direct thermal or color change layer configured to accept and display the visible indicia in response to thermal energy pulses from a thermal printer, the substrate and the print displaying layer having a density of brighteners below a pre-determined threshold, wherein the pre-determined threshold for density of brighteners provides a reflectance of 84%;

an excitable layer overlying the print displaying layer and comprising an excitable ink forming the excitable indicia, wherein the excitable indicia is printed separately from the visible indicia; and wherein the excitable ink exhibits luminescence when exposed to directed radiation, and the excitable ink is configured to generate a higher emitted intensity of a readable spectrum of light as compared to the print displaying layer when both are exposed to the directed radiation.

10. The identification medium of claim 9, wherein the density of brighteners in the substrate and print displaying layer generate a lower emitted intensity of visible light when exposed to directed radiation than when exposed to ambient light, such that a signal-to-noise ratio of the excitable indicia under the directed radiation is configured so as to be readable by a scanner system without interference from the visible indicia.

11. The identification medium of claim 9, further comprising a clear cover layer disposed between the print displaying layer and the excitable ink.

12. The identification medium of claim 9, wherein the direct thermal or color change layer is itself insensitive to or insoluble in solvents used with excitable inks.

13. The identification medium of claim 9, wherein the substrate emits light having a first spectral distribution and the excitable ink emits light having a second spectral distribution when both are exposed to directed radiation, wherein the second spectral distribution of the excitable ink is configured so as to be readable by a scanner system and wherein the first spectral distribution of the substrate has an intensity lower than that of the second spectral distribution such that a signal-to-noise ratio of the excitable ink under the directed radiation is configured so as to be detectable by the scanner system.

14. The identification medium of claim 13, wherein the excitable ink includes a fluorescent component configured to emit light having the second spectral distribution when exposed to the directed radiation, the fluorescent component including one or more of a fluorescent pigment and a fluorescent dye.

15. The identification medium of claim 9, wherein the directed radiation comprises ultraviolet or infrared light.

16. The identification medium of claim 9, wherein the identification medium comprises a label, a wristband or a tag.

17. An identification medium comprising a label, a wristband or a tag configured for displaying visible and excitable indicia, comprising:

a substrate having a print displaying layer wherein the print displaying layer comprises a direct thermal or color change layer configured to display the visible indicia in response to thermal energy pulses from a thermal printer, wherein the direct thermal or color change layer is itself insensitive to or insoluble in solvents used with excitable inks, the substrate and print displaying layer having a density of brighteners below a pre-determined threshold, wherein the pre-determined threshold for density of brighteners provides a reflectance of 84%;

an excitable layer overlying the print displaying layer and comprising excitable ink forming the excitable indicia, wherein the excitable indicia is printed separately from the visible indicia; and wherein the excitable ink exhibits luminescence when exposed to directed radiation, and the excitable ink is configured to generate a higher emitted intensity of a readable spectrum of light as compared to the print displaying layer when both are exposed to the directed radiation.

18. The identification medium of claim 17, wherein the density of brighteners in the substrate and the print displaying layer generate a lower emitted intensity of visible light when exposed to directed radiation than when exposed to ambient light, such that a signal-to-noise ratio of the excitable indicia under the directed radiation is configured so as to be readable by a scanner system without interference from the visible indicia.

19. The identification medium of claim 17, further comprising a clear cover layer disposed between the print displaying layer and the excitable ink.

20. The identification medium of claim 17, wherein the directed radiation comprises ultraviolet or infrared light.

21. The identification medium of claim 17, wherein the substrate emits light having a first emission wavelength distribution and the excitable ink emits light having a second emission wavelength distribution when the identification medium is exposed to the directed radiation.

22. The identification medium of claim 21, wherein the second emission wavelength distribution of the light emitted by the excitable ink is configured so as to be readable by a scanner system and wherein the first emission wavelength distribution of the light emitted by the substrate and print displaying layer is configured so as to not be readable by the scanner system.

23. The identification medium of claim 21, wherein the excitable ink includes a fluorescent component configured to exhibit the luminescence and emit light having the second spectral distribution when exposed to the directed radiation, the fluorescent component including one or more of a fluorescent pigment and a fluorescent dye.

* * * * *